Figure 1:
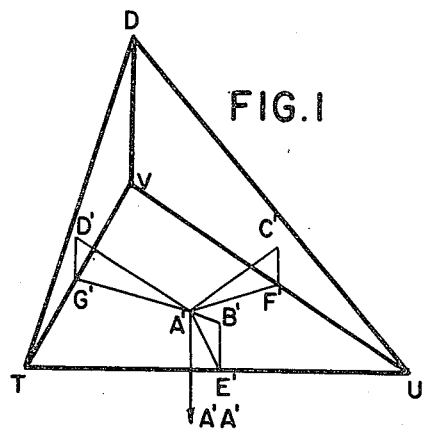

April 17, 1951  M. DE GROOTE ET AL  2,549,439
PROCESS FOR BREAKING PETROLEUM EMULSIONS
Filed Sept. 28, 1949  2 Sheets-Sheet 1

Melvin DeGroote
Arthur F. Wirtel
Owen H. Pettingill
INVENTORS

BY

ATTORNEYS

April 17, 1951  M. DE GROOTE ET AL  2,549,439
PROCESS FOR BREAKING PETROLEUM EMULSIONS
Filed Sept. 28, 1949  2 Sheets-Sheet 2
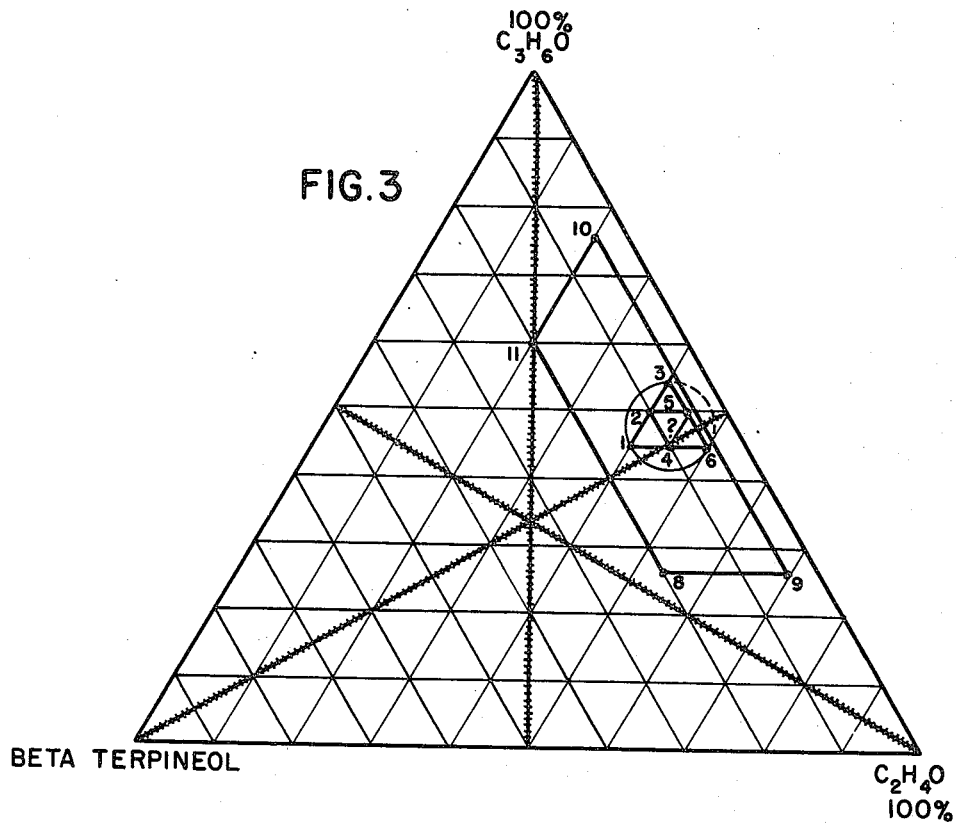
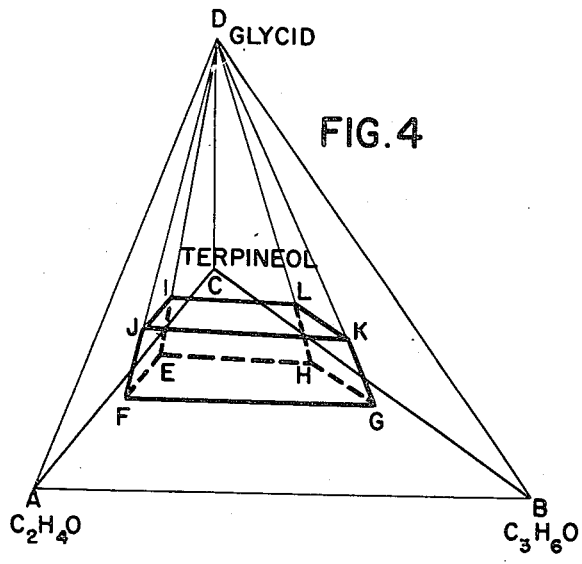
Melvin DeGroote
Arthur F. Wirtel
Owen H. Pettingill
INVENTOR.
BY
ATTORNEYS Patented Apr. 17, 1951

2,549,439

UNITED STATES PATENT OFFICE 2,549,439

PROCESSES FOR BREAKING PETROLEUM EMULSIONS

Melvin De Groote, University City, and Arthur F. Wirtel and Owen H. Pettingill, Kirkwood, Mo., assignors to Petrolite Corporation, Ltd., Wilmington, Del., a corporation of Delaware Application September 28, 1949, Serial No. 118,413

7 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is our companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See our copending application, Serial No. 118,414, filed September 28, 1949.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present process is concerned with the breaking of petroleum emulsions by means of certain glycol ethers of beta-terpineol, and particularly in the form of cogeneric mixtures, as hereinafter described. These products are obtained by treatment of beta-terpineol with glycide, ethylene oxide and propylene oxide within the limits and manner hereinafter specified.

It is well known that a variety of compounds containing a reactive hydrogen atom, i. e., a hydrogen atom attached to oxygen, nitrogen, or sulphur, will react with alkylene oxides, particularly ethylene oxide, or propylene oxide, and sometimes perhaps glycide, to yield the corresponding glycol or polyglycol derivative. Such oxyalkylated derivatives are readily prepared from chemical compounds in which the hydrogen atom is directly attached to oxygen, and particularly in the case of alcohols or phenols such as aliphatic alcohols, phenols, alkylaryl alcohols, alicyclic alcohols, phenoxyalkanols, substituted phenoxyalkanils, etc. Generally speaking, it has been found advantageous to react a water-insoluble hydroxylated material, having 8 carbon atoms or more, with an alkylene oxide so as to introduce water solubility, or at least significant or distinct hydrophile character, with the result that the derivative so obtained has surface-active properties.

Examples of suitable reactants of this type include octyl alcohol, decyl alcohol, dodecyl alcohol, tetradecyl alcohol, octadecyl alcohol, butylphenol, propylphenol, propylcresol, hexylphenol, octylphenol, nonylphenol, and cardanol, as well as the corresponding alicyclic alcohols obtained by the hydrogenation of the aforementioned phenols. It has been suggested that at least some of such materials be used in the resolution of petroleum emulsions. As far as we are aware, none of such materials represent products which are acceptable in demulsification today from a competitive standpoint. In the majority of cases such products are apt to be one-sixth, one-fifth, one-fourth, or one-third as good as available demulsifying agents on the same percentage-of-active-material basis, or same cost basis.

We have discovered a very few exceptions to the above general situation. For example, we have discovered if one treats beta-terpineol with glycide, ethylene oxide and propylene oxide so as to yield a cogeneric mixture of glycol ethers, that such mixed derivative has unusual properties, provided the composition lies within a certain range, as hereinafter specified. A specific exemplification of this range is the product obtained by treating one mole of beta-terpineol with one mole of glycide, then with 15 moles of propylene oxide, and then with 18 moles of ethylene oxide. Similarly, one may treat the glycide-treated beta-terpineol with the 18 moles of ethylene oxide first and then with the 15 moles of propylene oxide next.

In subsequent paragraphs from time to time reference is made to "compounds or cogeneric mixtures." At first glance it may appear that such language is indefinite, and perhaps contradictory. It is the intention at the moment only to point out that there is no inconsistency in such description and that subsequently there will be a complete explanation of why such designation is entirely proper.

As has been pointed out previously the present invention is concerned with certain reaction products or cogeneric mixtures obtained from four reactants or components combined in certain specific proportions as hereinafter described in detail. There is no difficulty in setting forth in graphic form a somewhat similar mixture obtained from three components instead of four, i. e., from terpineol, for example, either alpha or beta, and ethylene oxide and propylene oxide as distinguished from a quaternary mixture employing the same three reactants and also glycide in addition.

Our co-pending applications, Serial Nos. 109,791, through 109,797, inclusive, all filed August 11, 1941, and Serial No. 110,332, filed August 15, 1949, described tertiary mixtures using the conventional triangular graph. The transition from a triangular graph to what would normally be a spaced model (a regular tetrahedron) followed by subsequent modification so as to transform a three-dimensional model within certain limitations to a two-dimensional plane, presents a certain amount of detailed text and for this reason what is said subsequently will appear in certain parts or divisions, as follows:

Part 1 is concerned with the importance of glycide in affecting the structure of the derivatives, and the method of presentation herein employed with reference to Figures 1, 2, 3 and 4.

Part 2 is in essence the verbatim text as it appears in our co-pending applications, Serial Nos. 109,794, 109,795, 109,796, and 109,797, all filed August 11, 1949, and discusses the preparation of a tertiary mixture from a terpineol, ethylene oxide and propylene oxide, and discusses its presentation in the form of a triangular graph, together with detailed information as to the chemistry and structures involved.

Part 3 is concerned with the preparation of the compounds employing four components or four reactants and in its simplest form perhaps obtainable by treating the tertiary mixtures of Part 2 preceding with glycide within the range hereinafter specified, i. e., that the final reaction product, or cogeneric mixtures, contain at least 2% and not more than 25% of glycide.

Part 4 consists of tables in which the limiting values are set forth in detail in tabular form so that the invention is set forth with particularity by this particular means without necessary reference to the figures. Obviously, of course, such tables could not suitably be incorporated in the claims, and such tables represent the outside or limiting values only and do not include the intermediate values. This is the reason that the claims refer to the figures.

Part 5 is concerned with the use of the cogeneric mixtures or reaction products for demulsification.

PART 1

The present invention is concerned with a cogeneric mixture which is the end product of a reaction or reactions involving 4 reactants. Assuming completeness of reaction and based on a mathematical average, the final product is characterized most conveniently in terms of the 4 component reactants. This phase of the invention is described elsewhere in greater detail.

In representing a mixture or an end product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides. Such representation is employed, for example, in co-pending applications of Melvin DeGroote, Arthur F. Wirtel and Owen H. Pettingill, Serial Nos. 109,791, 109,792, 109,793, 109,794, 109,795, 109,796 and 109,797, all filed August 11, 1949, and Serial No. 110,332, filed August 15, 1949.

Chemists and physicists ordinarily characterize a 4-component system by using a solid, i. e., a regular tetrahedron. In this particular presentation each point or apex represents 100% of each of the 4 components, each of the 6 edges represents a line or binary mixture of the 3 components represented by the apexes or points at the ends of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point with the regular tetrahedron one has definitely characterized and specified a 4-component mixture in which the 4 components add up to 100%.

Figure 2:
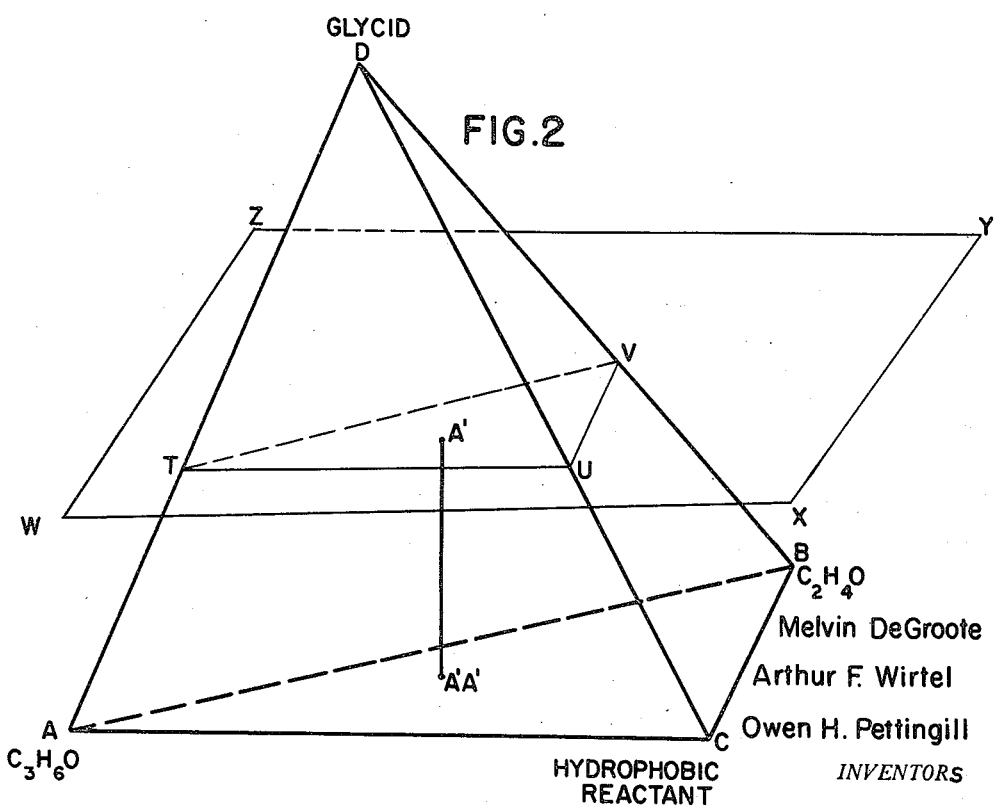

The invention will be described by reference to the accompanying drawings, which illustrate, in conventional graphical form, compositions used in accordance with the invention in terms of the four components. In the drawings, Figure 1 is a conventional tetrahedron, distorted somewhat for clarity to illustrate how a point within it fixes the proportions of the four constituents; Figure 2 is such a tetrahedron used to illustrate how, having a fixed amount of one constituent the other three may be determined by reference to a planar figure, of the type shown in Figure 3; and Figure 4 is another conventional tetrahedron in which a trapezoidal area is blocked out which defines the scope of the invention.

In accompanying Figure 1 an attempt is made to illustrate this system of representation visibly in a plane surface. For sake of convenience one need only consider a regular tetrahedron resting on one face or triangular surface. If somewhere towards the middle of such tetrahedron one places a plane parallel to the base of the tetrahedron one again obtains an equilateral triangle which, of course, is reduced in size compared with the equilateral triangle which is the bottom of the regular tetrahedron. In Figure 1 the tetrahedron may be considered as formed by some transparent material and for convenience the new tetrahedron formed by the passage of the horizontal plane is, of course, a regular tetrahedron also. For convenience, one can consider that he is looking directly at this tetrahedron which is shown somewhat distorted for purpose of convenience, and in the smaller regular tetrahedron the apexes are T, U, V and D. The lines are TU, VU, TV and VD. The four equilateral triangles are TVD, UVD, TUV and TUD. Bearing in mind that this tetrahedron is just the upper part of what is assumed as being part of a larger tetrahedron and not showing, it is assumed for purpose of illustration that a point has been selected within this larger tetrahedron to indicate a specific mixture composed of 4 components. For convenience, the point is taken as A'. If from A' perpendiculars are erected to each of the four planes then there are designated at least three of them by lines which are shown and indicated as follows: A'B', A'C', A'D'. The fourth perpendicular goes from A' to the point in the plane beneath which is the assumed base of the original larger regular tetrahedron. Since the larger tetrahedron is not shown for the reason that it would only add confusion, this perpendicular is indicated simply by the line A'—A'A'.

What has been said previously is illustrated in a slightly different aspect actually showing both the large tetrahedron and the plane in Figure 2. In this instance again the regular tetrahedron must be presented in a somewhat distorted aspect in order to show what is desired. The present invention is concerned with a cogeneric mixture derived from 4 components, to wit, ethylene oxide, propylene oxide, glycide, and hydrophobic reactant which is susceptible to reaction with the 3 enumerated alkylene oxides. These 4 components or initial reactants represent the 4 points or apexes of the regular tetrahedron and it will be noted that in this presentation the 4 apexes are marked A, B, C and D. A represents 100% of propylene oxide, B represents 100% of ethylene oxide, D represents 100% of glycide and C represents 100% of hydrophobic reactant.

Referring momentarily to what has been said in regard to Figure 1 it will be noted that a perpendicular which is comparable is shown as a line connecting point A' with point A'A'. More important, however, is this fact, that when a plane is placed parallel to the base such plane of necessity has the same configuration as the base. If one selected some particular figure in the base, for instance a triangle, a square, a rectangle, a pentagon, or the like, and drew lines from the corners or apexes of such plane figure in the base, to the top apex D, then that same figure but in a reduced size would appear in the intersecting plane TUV shown in this particular Figure. TUV is the equilateral triangle furnished by the intersecting plane WXYZ which intersects the regular tetrahedron parallel to the base.

It is convenient to ignore temporarily Figure 3 and pass to Figure 4. Figure 4 again depicts the regular tetrahedron but actually is somewhat distorted, of course. It also shows a space or block within the tetrahedron and since the block is assumed to be somewhat above the base, each and every point in this block represents a 4-component system. The present invention is concerned with those compositions which are characterized and specified by this particular block. As stated previously if 3-dimensional models could be employed all that would be necessary would be to prepare the tetrahedron from sheets of plastic so that 100 sheets, for example, would represent the distance between the base and the apex, cut out the space represented by the block, and fill it in with colored wax or another plastic, and thus the representation would be complete. This is not possible due to limitations which have been pointed out previously.

The composition represented by the block which is really a truncated trapezoidal pyramid is designated by E, F, G, H, I, J, K, and L. Bear in mind that, as has been stated, the base of the truncated pyramid, that is, E, F G, and H, does not rest on the bottom of the equilateral base triangle. As has been pointed out previously, point D represents 100% glycide. The base triangle represents the three other components and obviously 0% glycide. For purpose of what is said herein, the lower base of the truncated pyramid, E, F, G, H, is a base parallel to the equilateral triangle but two units up, i. e., representing 2% of glycide. Similarly, the upper base of the truncated pyramid, I, J, K, L lies in a plane which is 25 units up from the base, to wit, represents 25% glycide. Specifically, then, this invention is concerned with the use of compounds in which the glycide component varies from 2% to 25% glycide. The problem then presented is the determination of the other three components, to wit, ethylene oxide, propylene oxide, and the hydrophobic reactant.

A simplification of the problem of characterizing a 4-component system which enters into the spirit of the present invention is this: If the amount of one component is determined or if a range is set, for example, 2% to 25% of glycide, then the difference between this amount and 100%, i. e., 75% to 98%, represents the amounts of percentages of the other three components combined, and these three components recalculated to 100% bases can be determined by use of an ordinary triangular graph, such as employed in our previously mentioned eight co-pending applications, Serial Nos. 109,791, to 109,797, inclusive, and Serial No. 110,332.

This becomes even simpler by reference to Figure 1 in which it will be assumed that the amount of glycide is within the range of 2% to 25%, and and since the base of the tetrahedron is an equilateral triangle the plane parallel to the base and through any point on the perpendicular which represents 2% to 25%, must also be an equilateral triangle.

In Figure 1 from the point A' there are the three conventional perpendiculars to the sides as employed in a 4-component system, i. e., A'B', A'C', A'B'; however, by definition the lines A'B', A'C', and A'D' must be perpendicular to the faces. This means that the angles G'D'A', A'C'F', and A'B'E', are right angles. Similarly, the angles D'G'A', A'E'B', and A'F'C' represent the angles between the faces of a regular tetrahedron and thus are constant. Since two angles of the triangle are the same, the third angle must be the same and it means that these three triangles are similar. This means that the ratio between the perpendiculars to the sides, that is, A'B', A'C', and A'D' bear the same ratio to each other as the perpendiculars to the edges bear to each other to wit, A'D', A'F', and A'G'. Therefore, when the fourth component, for example, glycide, has been set within the range 2% to 25%, the remaining three components consisting of 75% to 98% recalculated back to 100% bases, can be calculated or represented by the same triangular graph as is conventional and as employed in the abovementioned co-pending applications, Serial Nos. 109,791 through 109,797, filed August 11, 1949, and Serial No. 110,332.

Actually, as far as the limiting points in the truncated pyramid are concerned, which has been previously referred to in Figure 4, it will be noted that in the subsequent text there is a complete table giving the composition of these points for each successive range of glycide. In other words, a perfectly satisfactory repetition is available by means of these tables from a practical standpoint without necessarily resorting to the data of Figure 3.

Figure 3 shows a triangle and the three components other than glycide. These three components added together are less than 100%, to wit, 75% to 90%, but for reasons explained are calculated back to 100%. This point is clarified subsequently by examination of the tables. It will be noted also that in Figure 3 there is shown not only a trapezoid indicated by points 8, 9, 10 and 11 which represent the bases (top, bottom, or for that matter, intermediate) of the truncated pyramid, but also area in which the composition is of particular effectiveness as a demulsifier. The circular and triangular areas can be ignored if desired as far as the general aspect of the present invention goes, but since we are making direct comparison with our aforementioned co-pending applications, to wit, Serial Nos. 109,791 to 109,797, inclusive, and Serial No. 110,332, we are employing exactly the same identical figure for ease of comparison.

Previous reference has been made to our copending applications, Serial Nos. 109,791 to 109,797, inclusive, all filed August 11, 1949, and Serial No. 110,332, filed August 15, 1949. As stated, these were concerned with products or cogeneric mixtures obtained from three components—an oxyalkylation-susceptible hydrophobic reactant, ethylene oxide and propylene oxide. The present invention contains the fourth component, glycide. At first glance it may seem rather odd that the introduction of glycide in even relatively small amounts radically affects the nature of the resultant products.

Comparing ethylene oxide, propylene oxide, and glycide, it is to be noted that in ethylene oxide the ratio of carbon atoms to oxygen is 2 to 1, in propylene oxide 3 to 1, and in glycide 1.5 to 1. This carbon-oxygen ratio, of course, explains the greater solubilizing effect of glycide in comparison with either ethylene oxide or propylene oxide but the principal difference is that in using glycide one can obtain a variety of branched chain or forked structures.

Assume that the hydrophobic oxyalkylation-susceptible reactant has one or more terminal groups which may be indicated thus:

$$-R-OH$$

R simply represents a divalent radical. Reaction with ethylene oxide, propylene oxide and glycide may be shown thus:

$$-R-O-C_2H_4OH$$
$$-R-O-C_3H_6OH$$

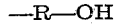

If one employs ethylene oxide first and then glycide, or propylene oxide first and then glycide, one obtains an increased hydrophile effect at the terminal groups for the reason there are two hydroxyls present instead of one, which additionally are susceptible to more complex micellar formation by virtue of association involving two hydroxyls. This is illustrated in the following manner:

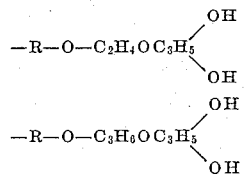

It becomes obvious that glycide can be employed in a number of ways, three of which are as follows: (a) immediately and preceding the introduction of either ethylene oxide or propylene oxide; (b) after ethylene oxide has been introduced and before propylene oxide has been introduced, or vice versa; after propylene oxide has been introduced and before ethylene oxide has been introduced; and finally (c) glycide can be introduced in a terminal position after both ethylene oxide and propylene oxide have been introduced. Needless to say, glycide could be introduced in all three of these positions, or in two of the three. For that matter some ethylene oxide can be introduced, then glycide, and more ethylene oxide, or some propylene oxide, then glycide and more propylene oxide.

Suggestive of such variations are the following formulas:

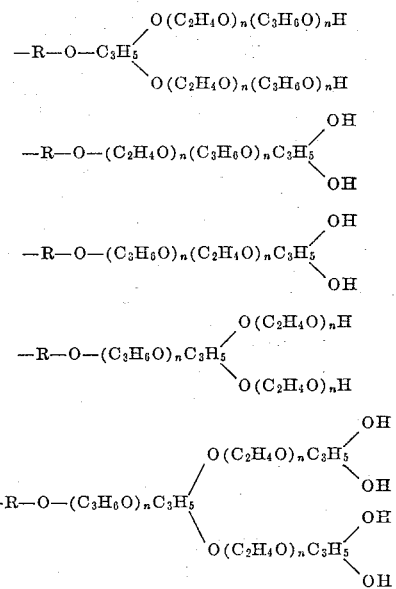

For sake of simplicity it appears advisable to present mixtures obtained from three components first (the oxyalkylation-susceptible hydrophobic reactant, ethylene oxide and propylene oxide) and then carry the three-component system into the four-component system by aftertreatment with glycide within the stipulated proportions. After such description it becomes obvious that other modifications of the kind previously suggested readily present themselves and need only minor description. For this reason the subject matter immediately following is in substantially verbatim form as it appears in our co-pending applications, Serial Nos. 109,794 to 109,797, inclusive, all filed August 11, 1949.

PART 2

As has been pointed out previously, for simplicity of presentation and particularly for convenience of comparison with certain co-pending applications, particularly Serial Nos. 109,794, 109,795, 109,796, and 109,797, all filed August 11

1949, the text immediately following is concerned with the derivatives obtained without the use of glycide. The conversion or modification of the three-component system to a four-component system is presented in Part 4.

Reference is made to the accompanying Figure 3, in which there is presented a triangular graph showing the composition of certain glycol ethers of beta-terpineol, or cogeneric mixtures thereof, derivable from beta-terpineol and ethylene oxide alone, or beta-terpineol and propylene oxide alone, or beta-terpineol, and both propylene oxide and ethylene oxide, in terms of the initial reactants. We have found that effective demulsifying agents lie approximately within a small and hitherto unsuspected area indicated by the trapezoid determined by the points 8, 9, 10 and 11. More specifically particularly effective demulsifying agents appear within a smaller range, as set forth approximately by the area indicated by the segment of a circle in which the area of the segment is limited to derivatives in which beta-terpineol contributes at least 4% by weight of the ultimate compound or cogeneric mixture.

The circle itself is identified by the fact that the points 1, 3 and 6 appear on the circle. The more effective of these better compounds or cogeneric mixtures are those which appear within the triangle which represents part of the circle and part of the segment, to wit, the triangle identified by the points 1, 3 and 6. The most effective compounds or cogeneric mixtures of all are those which fall within the inner central triangle of the larger outer triangle identified by the points 1, 3 and 6, to wit, the smaller triangle identified by the points 2, 4 and 5. The most outstanding of these effective compounds or cogeneric mixtures is one which appears to fall substantially at the center of the smaller triangle, identified by point 7. This particular point is obtained by treating one mole of alpha-terpineol with 15 moles of propylene oxide, followed by treatment with 18 moles of ethylene oxide.

In spite of the unique character of the compounds or cogeneric mixtures previously described, we have made additionally an invention within an invention. This can be illustrated by reference to the compounds or cogeneric mixtures whose composition is determined by the inner triangle, 2, 4, 5. This preferred class of derivatives, or for that matter, all the herein described products, can be made in three different ways: (a) by adding propylene oxide first and then ethylene oxide; (b) by adding ethylene oxide first and then propylene oxide; or (c) by adding the two oxides by random, indifferent, or uncontrolled addition so as to produce a polyglycol ether in which the propylene radicals and ethylene radicals do not appear in continuous succession but are heterogeneously distributed.

We have found that if propylene oxide is added first, and then ethylene oxide is added, the compounds or cogeneric mixtures so obtained are invariably and inevitably more effective as demulsifiers, and are also more effective for other purposes than the comparable glycol ethers of alpha-terpineol made by combining the three reactants in any other sequence. This will be explained further with additional illustrations subsequently.

As an illustration of the preparation of various compounds or cogeneric mixtures, and particularly the most desirable ones, and also those which are helpful in setting the limits in the graph previously referred to, the following examples are included. In connection with these examples it will be noted that the oxyalkylation of alpha-terpineol, i. e., by treatment with ethylene oxide or propylene oxide or a mixture of the two, is conventional. The procedure is conducted in the same manner employed in connection with other alcohols or the like, and generally an alkaline catalyst is employed. See, for example, U. S. Patent No. 2,440,093, dated April 20, 1948, to Israel, and British Patent No. 602,591, applied for February 12, 1945.

*Example 1a*

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M. There were charged into the autoclave 15.4 pounds of beta-terpineol. There were then added 12½ ounces (approximately 5% by weight) of ground caustic soda. The autoclave was sealed, swept with nitrogen gas, and stirring started immediately and heat applied, and the temperature allowed to rise to approximately 150° C. At this point addition of propylene oxide was started. It was added continuously at such speed that it was absorbed by the reaction as rapidly as added. The amount of propylene oxide added was 88 pounds. The time required to add this propylene oxide was slightly in excess of four hours, about 4¾ hours. During this time the temperature was maintained at 150° to 160° C., using cooling water through the inner coils, when necessary, and otherwise applying heat, if required. At the end of the addition of the propylene oxide there was added ethylene oxide, as previously indicated. The amount of ethylene oxide added was 92.4 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was about the same, or slightly less, usually just a little more than an hour.

During the addition of the oxides, the pressure was held at approximately 50 pounds per square inch gauge pressure, or less. When all the oxide had been added (ethylene oxide being the final addition in this particular instance) the autoclave was permitted to stay at the same temperature range for another half hour, even longer, if required, or until the gauge pressure had been reduced to zero or substantially zero, indicating the reaction was complete. The final product was an oily material, somewhat viscous in nature, resembling castor oil and having a definite beta-terpineol or terpene-like odor. It was soluble in water and also soluble in non-aqueous solvents, such as aromatic hydrocarbons, and others, although not soluble in some non-polar hydrocarbon solvents. The final yield was substantially the total weight of the initial reactants.

*Example 2a*

The same procedure was followed as in Example 1a, preceding, except that the order of addition of the oxides was reversed, the ethylene oxide being added first and the propylene oxide last. The time period, temperature range, pressure, etc., were kept the same as in Example 1a, preceding.

Example 3a

The same procedure was followed as in Example 1a, except that a mixture, to wit, 168 pounds of propylene oxide and ethylene oxide, were added over a two-hour period. This mixture of ethylene oxide and propylene oxide was obtained from 88 pounds of propylene oxide and 80 pounds of ethylene oxide. In this instance again the time range, temperature, and pressure were kept substantially the same as in Example 1a, preceding.

Example 4a

The same procedure was followed as in Example 1a, preceding, but was conducted on a laboratory scale employing a small autoclave having a capacity of approximately one liter, or up to a 5-gallon size. The amount of beta-terpineol employed was 46.2 grams, the amount of propylene oxide employed was 259.3 grams, and the amount of ethylene oxide employed was 240 grams. The amount of caustic soda used as a catalyst was 2.33 grams. The operating conditions were substantially the same as on larger scale. Actually, the reaction seemed to go faster in the small autoclave and the time of absorption could be reduced, if desired. In many instances, absorption would take place in the laboratory autoclave in a fraction of the time required in the larger autoclave; in fact, in many instances absorption was complete in 5 to 10 or 15 minutes, as compared to one hour on a larger scale. Needless to say, on a large scale, addition must be conducted carefully because there is an obvious hazard in handling a large quantity of material in an autoclave which is not necessarily present in the use of a small vessel.

Example 5a

The same procedure was followed as in Example 4a, preceding, in every respect, except the variation described in Example 2, preceding, i. e., the ethylene oxide, was added first and the propylene oxide added last.

Example 6a

The same procedure was followed as in Example 4a in every instance except the modification previously described in Example 3a, to wit, the propylene oxide and the ethylene oxide were mixed together and added in approximately 15 minutes to one-half hour. In all other respects the procedure was identical with that described in Example 4.

Previous reference has been made to the fact that there is a distinct difference in structure between alpha-terpineol and beta-terpineol. Reference has been made also to the fact that it is sometimes more difficult to oxyalkylate beta-terpineol, particularly to oxypropylene beta-terpineol, at least in the initial stage, than in the case of alpha-terpineol. Possibly the structural difference is the basis for this retarded activity. As an illustration of this difference, reference is made to the two following examples, to wit, Examples 7 and 8.

In Example 7 alpha-terpineol is treated with, roughly, 15 moles of propylene oxide and then with 18 moles of ethylene oxide. In Example 8 the experiment was repeated, using beta-terpineol. Note the time-pressure difference in oxypropylation.

Example 7a

The reaction vessel employed was a glass Pyrex pipe, flanged at both ends, containing heating coils, stirring propellors and tubes designed to allow continuous addition of ethylene and propylene oxide below the liquid level. All metal structure was stainless steel. The stirring speeds used were approximately 1750 R. P. M. The capacity of the reactor was about 1½ gallons. The reactor was charged with 400 grams of alpha-terpineol, 400 grams of an inert solvent (high boiling aromatic petroleum solvent), and 20 grams sodium hydroxide. The temperature was brought up to 160° C. and held there throughout the entire experiment. Propylene oxide was run in at a rate which produced no more than a maximum pressure of 5 pounds on the reactor. The entire oxypropylation time was about 4 hours. About 2250 grams of propylene oxide were run in during this time. Following the oxypropylation about 275 grams of ethylene oxide were run in, in about 4 hours. The whole mixture was then diluted with 1,000 grams more of the same inert solvent previously used.

The final product was an oily liquid, clear, and having a slight piney odor. It was soluble or emulsifiable in water and also soluble in some non-aqueous solvents. The final yield was substantially the total weight of the initial reactants.

Example 8a

The same procedure was followed as in Example 7a, but beta-terpineol was used in place of alpha-terpineol. The following ingredients were charged into the reactor:

| | Grams |
|---|---|
| Beta-terpineol, technical grade | 300 |
| Inert solvent | 300 |
| Sodium hydroxide | 15 |

The entire mixture was brought up to 160° C. and held there throughout the experiment. Propylene oxide was started in, exactly as in Example 7. However, the pressure rose above 5 pounds sometimes going as high as 15 pounds, indicating that the reaction was not taking place. More catalyst was then added, until 7 grams of sodium hydroxide and 5 grams of sodium methoxide had been charged into the reactor. With the extra catalyst added, the propylene oxide combined at a pressure of 5 pounds, but very much more slowly than it did with the alpha-terpineol. The total oxypropylation time was about 10 hours. A total of 1689 grams of propylene oxide were run in this time. 1555 grams of ethylene oxide were run in after the propylene oxide was added. The ethylene oxide reacted in about four hours, as in Example 7, after which 750 grams of the same inert solvent as used above were added to the mixture.

The final yield was substantially the same as the total weight of the reactants, and was a clear, viscous liquid, having a piney odor.

The following table includes a series of compounds or cogeneric mixtures which have been selected as exemplifying the herein included products. Types of the herein noted compounds or cogeneric mixtures have been produced in three different ways: (a) first adding the propylene oxide and then the ethylene oxide; (b) first adding the ethylene oxide and then the propylene oxide; and (c) mixing the ethylene oxide and the propylene oxide together and adding them simultaneously.

The data are summarized in the following table:

| Ex. No. | Beta-Terpineol | | | Propylene Oxide | | | Ethylene Oxide | | | Point on graph identifying specific Glycol Ether |
|---|---|---|---|---|---|---|---|---|---|---|
| | Weight Used, in Grams | Molal Ratio | Weight Per Cent, in Final Glycol Ether | Weight Used, in Grams | Molal Ratio | Weight Per Cent, in Final Glycol Ether | Weight Used, in Grams | Molal Ratio | Weight Per Cent, in Final Glycol Ether | |
| A | 154 | 1.0 | 15.0 | 462 | 7.96 | 45 | 411 | 9.34 | 40 | 1 |
| B | 154 | 1.0 | 10.0 | 771 | 13.3 | 50 | 615 | 14.0 | 40 | 2 |
| C | 154 | 1.0 | 5.0 | 1,700 | 29.3 | 55 | 1,232 | 28.0 | 40 | 3 |
| D | 154 | 1.0 | 10.0 | 693 | 11.95 | 45 | 693 | 15.77 | 45 | 4 |
| E | 154 | 1.0 | 5.0 | 1,542 | 26.6 | 50 | 1,390 | 31.6 | 45 | 5 |
| F | 154 | 1.0 | 5.0 | 1,390 | 23.95 | 45 | 1,542 | 35.10 | 50 | 6 |
| G | 154 | 1.0 | 8.45 | 866 | 14.95 | 47.55 | 800 | 18.17 | 44 | 7 |
| H | 154 | 1.0 | 9.2 | 812 | 14.0 | 48.6 | 704 | 16.0 | 42.2 | (¹) |
| I | 154 | 1.0 | 9.0 | 812 | 14.0 | 47.4 | 748 | 17.0 | 43.6 | (¹) |
| J | 154 | 1.0 | 8.8 | 812 | 14.0 | 46.2 | 792 | 18.0 | 45.0 | (¹) |
| K | 154 | 1.0 | 8.7 | 870 | 15.0 | 49.0 | 748 | 17.0 | 43.3 | (¹) |
| G | 154 | 1.0 | 8.45 | 866 | 14.96 | 47.55 | 800 | 18.17 | 44 | ² 7 |
| L | 154 | 1.0 | 8.3 | 870 | 15.0 | 46.7 | 836 | 19.0 | 45.0 | (¹) |
| M | 154 | 1.0 | 8.2 | 934 | 16.0 | 49.5 | 792 | 18.0 | 42.3 | (¹) |
| N | 154 | 1.0 | 8.0 | 934 | 16.0 | 48.5 | 836 | 19.0 | 43.5 | (¹) |
| O | 154 | 1.0 | 7.8 | 934 | 16.0 | 47.4 | 880 | 20.0 | 44.8 | (¹) |
| P | 154 | 1.0 | 20.0 | 200 | 3.45 | 26 | 416 | 9.45 | 54 | ² 8 |
| Q | 154 | 1.0 | 4.0 | 1,000 | 17.25 | 26 | 2,690 | 61.2 | 70 | ³ 9 |
| R | 154 | 1.0 | 4.0 | 2,925 | 50.4 | 76 | 770 | 17.5 | 20 | ³ 10 |
| S | 154 | 1.0 | 20.0 | 462 | 7.96 | 60 | 154 | 3.5 | 20 | ³ 11 |

¹ Within inner triangular area.
² Duplicated for convenience.
³ Indicates limits of trapezoidal area.

In the preparation of the above compounds the alkaline catalyst used was either flake caustic soda finely ground with mortar and pestle, or powdered sodium methylate, equivalent to 5% by weight of the beta-terpineol which was employed.

For reasons which are pointed out hereinafter in greater detail, it is substantially impossible to use conventional methods and obtain a single glycol ether of the kind described. Actually, one obtains a cogeneric mixture of closely related or touching homologues. These materials invariably have high molecular weights and cannot be separated from one another by any known method without decomposition. The properties of such a mixture represent the contribution of the various individual members of the mixture.

Although one cannot draw a single formula and say that by following such and such procedure one can obtain 80% or 90% or 100% of such single compound, yet one can readily draw the formulae of a large number of compounds which appear in some of the mixtures described elsewhere, or can be prepared readily as components of mixtures which are manufactured conventionally. Such formulae, representing significant portions of various mixtures, are of distinct value, insofar that they themselves characterize the invention, i. e., describe individual components which are typical of the members of the cogeneric mixture. In the following formulae, since ROH can represent beta-terpineol, RO is the ether radical obtained from beta-terpineol by removal of the hydrogen atom attached to the oxygen atom.

(1)  $RO(C_2H_4O)_{17}(C_3H_6O)_{15}H$
(2)  $RO(C_2H_4O)_{18}(C_3H_6O)_{15}H$
(3)  $RO(C_2H_4O)_{19}(C_3H_6O)_{15}H$
(4)  $RO(C_2H_4O)_{18}(C_3H_6O)_{16}H$
(5)  $RO(C_2H_4O)_{19}(C_3H_6O)_{16}H$
(6)  $RO(C_2H_4O)_{20}(C_3H_6O)_{16}H$
(7)  $RO(C_2H_4O)_{20}(C_3H_6O)_{17}H$
(8)  $RO(C_2H_4O)_{21}(C_3H_6O)_{17}H$
(9)  $RO(C_3H_6O)_{15}(C_2H_4O)_{17}H$
(10) $RO(C_3H_6O)_{15}(C_2H_4O)_{18}H$
(11) $RO(C_3H_6O)_{15}(C_2H_4O)_{19}H$
(12) $RO(C_3H_6O)_{16}(C_2H_4O)_{18}H$
(13) $RO(C_3H_6O)_{16}(C_2H_4O)_{19}H$
(14) $RO(C_3H_6O)_{16}(C_2H_4O)_{20}H$
(15) $RO(C_3H_6O)_{17}(C_2H_4O)_{20}H$
(16) $RO(C_3H_6O)_{6}(C_2H_4O)_{18}(C_3H_6O)_{9}H$
(17) $RO(C_3H_6O)_{7}(C_2H_4O)_{18}(C_3H_6O)_{8}H$
(18) $RO(C_3H_6O)_{8}(C_2H_4O)_{18}(C_3H_6O)_{7}H$
(19) $RO(C_3H_6O)_{6}(C_2H_4O)_{18}(C_3H_6O)_{9}H$
(20) $RO(C_3H_6O)_{5}(C_2H_4O)_{18}(C_3H_6O)_{10}H$
(21) $RO(C_2H_4O)_{8}(C_3H_6O)_{15}(C_2H_4O)_{10}H$
(22) $RO(C_2H_4O)_{9}(C_3H_6O)_{15}(C_2H_4O)_{9}H$
(23) $RO(C_2H_4O)_{10}(C_3H_6O)_{15}(C_2H_4O)_{8}H$
(24) $RO(C_2H_4O)_{11}(C_3H_6O)_{15}(C_2H_4O)_{7}H$
(25) $RO(C_3H_6O)_{8}(C_2H_4O)_{7}(C_3H_6O)_{7}(C_2H_4O)_{11}H$
(26) $RO(C_3H_6O)_{8}(C_2H_4O)_{8}(C_3H_6O)_{7}(C_2H_4O)_{10}H$
(27) $RO(C_3H_6O)_{7}(C_2H_4O)_{9}(C_3H_6O)_{8}(C_2H_4O)_{9}H$
(28) $RO(C_3H_6O)_{7}(C_2H_4O)_{10}(C_3H_6O)_{8}(C_2H_4O)_{8}H$
(29) $RO(C_2H_4O)_{10}(C_3H_6O)_{8}(C_2H_4O)_{8}(C_3H_6O)_{7}H$
(30) $RO(C_2H_4O)_{9}(C_3H_6O)_{8}(C_2H_4O)_{9}(C_3H_6O)_{7}H$
(31) $RO(C_2H_4O)_{9}(C_3H_6O)_{7}(C_2H_4O)_{9}(C_3H_6O)_{8}H$
(32) $RO(C_2H_4O)_{8}(C_3H_6O)_{7}(C_2H_4O)_{10}(C_3H_6O)_{8}H$

If one selects any hydroxylated compound and subjects such compound to oxyalkylation, such as oxyethylation or oxypropylation, it becomes obvious that one is really producing a polymer of the alkylene oxide, except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for sake of convenience, may be indicated as $RO(C_2H_4O)_{30}H$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric, closely related series of touching homologous compounds. Considerable investigation has been made in regard to the distribution curves for linear polymers. Attention is directed to the article entitled "Fundamental principles of condensation polymerization," by Paul J. Flory, which appears in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

Actually, from a practical standpoint, it is much more satisfactory, perhaps, to describe the ultimate composition in terms of the reactants, i. e., beta-terpineol and the two alkylene oxides. The reason for this statement is the following: If one selects a specific compound, it must be borne in mind that such compound is specific only insofar that the cogeneric mixture in terms of a statistical average will conform to this formula. This may be illustrated by an example, such as $RO(C_3H_6O)_{15}(C_2H_4O)_{18}H$. If one combines the reactants in the predetermined weight ratio so as to give theoretically this specific component, and assuming only one chemical compound were formed, what happens is that, although this particular compound may be present in a significant amount and probably less than 50%, actually one obtains a cogeneric mixture of touching homologues in which the statistical average does correspond to this formula. For instance, selecting reactants, which, at least theoretically, could give the single compound $RO(C_3H_6O)_{15}(C_2H_4O)_{18}H$, what actually happens is that one obtains a sort of double cogeneric mixture, for the reason that in each batch or continuous addition of an alkylene oxide a cogeneric mixture is formed. Since the present products require the addition of at least two different multi-molar proportions of each of two different alkylene oxides (ethylene oxide and propylene oxide) it becomes obvious that a rather complex cogeneric mixture must result.

This can be best illustrated by example. Assume that one is going to use the indicated ratio, to wit, one pound mole of beta-terpineol, 15 pound moles of propylene oxide, and 18 pound moles of ethylene oxide. The initial step involves the treatment of one pound mole of beta-terpineol with 15 pound moles of propylene oxide, so as to yield theoretically $RO(C_3H_6O)_{15}H$; actually, as pointed out, one does not obtain $RO(C_3H_6O)_nH$ in which $n$ is 15, but really one obtains a cogeneric mixture in which there are present significant amounts of homologues in which $n$ varies from 10, 11 and 12, on up to 17, 18 and possibly 19 or 20. A statistical average, however, must, of course, correspond to the proportion of the initial reactants, i. e., a compound of the formula $RO(C_3H_6O)_{15}H$ which is present undoubtedly to a significant extent.

When this cogeneric mixture is then subjected to reaction with 18 moles of ethylene oxide, it becomes obvious that, although one may obtain some $RO(C_3H_6O)_{15}(C_2H_4O)_{18}H$, yet this particular product can be present only to a minor extent, for reasons which have been described in connection with oxyethylation and which now are magnified to a greater degree of oxypropylation. Stated another way, it is probable that the cogeneric mixture represents something like $RO(C_3H_6O)_n(C_2H_4O)_{n'}H$ in which, as previously pointed out, components present in important percentages are those in which $n$ could vary from anywhere beginning with 10 to 12, on up to 18 or 20. By the same token, components present in important percentages are those in which $n'$ could vary anywhere from 13 or 14 up to the lower 20's, such as 21, 22, 23 or 24. Indeed, homologues of a lower or a higher value of $n$ and $n'$ will be present in minor amounts, the percentage of such components decreasing, the farther removed they are from the average composition. However, in spite of such variation in regard to the cogeneric mixture, the ultimate composition, based on the ingredients which enter into it and based on the statistical average of such constituents, can still be expressed by the formula $RO(C_3H_6O)_{15}(C_2H_4O)_{18}H$. This actual product exists to some degree in the cogeneric mixture, but it should be looked upon as a statistical average formula, rather than the structure of a single or predominant compound in the mixture.

A second reason for employing a reaction mixture to describe the product, is the fact that the molal proportions need not represent whole numbers. We have just pointed out that if one selects molal proportions corresponding to $$RO(C_3H_6O)_{15}(C_2H_4O)_{18}H$$

then the constituents are added in actual molar proportions, based on whole numbers. If, however, one selects a point in the inner triangular area, which, when recalculated in terms of molar proportions, produces a fractional number, there is still no reason why such proportion of initial reactant should not be adopted. For instance, one might select a point in the triangular graph, which, when calculated in terms of molecular proportions, represents a formula, such as the following: $RO(C_3H_6O)_{15.5}(C_2H_4O)_{18}H$. This, of course, would be immaterial, for the reason that if one starts with a pound mole of beta-terpineol and adds 15.5 pound moles of propylene oxide, one will obtain, on the average, a mixture closely comparable to the one previously described, using exactly 15 pound moles of propylene oxide instead of 15.5. Such mixture corresponds to the compound $RO(C_3H_6O)_{15.5}H$ only in the sense of the average statistical value, but not in the sense that there actually can be a compound corresponding to such formula. Further discussion of this factor appears unnecessary in light of what has been said previously.

Such mixture could, of course, be treated with 18 pound moles of ethylene oxide. Actually, all that has been said sums up to this, and that is, that the most satisfactory way, as has been said before, of indicating actual materials obtained by the usual and conventional oxyalkylation process, is in terms of the initial reactants, and it is obvious that any particular point on the triangular graph, from a practical standpoint, invariably and inevitably represents the statistical average of several or possibly a dozen or more closely related cogeners of almost the same composition, but representing a series of touching homologues. The particular point selected represents at least the composition of the mixture expressed empirically in the terms of a compound representing the statistical average.

Previous reference has been made to the fact that comparatively few oxyalkylated derivatives of simple hydroxylated compounds find utility in actual demulsification practice. We have pointed out that we have found a very few exceptions to this rule. The fact that exceptions exist, as in the instant invention, is still exceedingly difficult to explain, if one examines the slight contribution that the end group, derived from the hydroxylated material, makes to the entire compound. Referring for the moment to a product of the kind which has been described and identified by the formula $RO(C_3H_6O)_{15}(C_2H_4O)_{18}H$, it becomes apparent that the molecular weight is in the neighborhood of 1800 and actually the beta-terpineol contributes less than 10% of the molecular weight. As a matter of fact, in other comparable compounds the beta-terpineol may contribute as little as 4% or 5% and yet these particular compounds are effective demulsifiers. Under such circumstances it would seem reasonable to expect that some other, or almost any other, cyclic 6-carbon atoms compound comparable to beta-terpineol would yield derivatives equally effective. Actually, this is not the case. We know of no theory or explanation to suggest this highly specific nature or action of the compound or cogeneric mixture derived from beta-terpineol.

Referring to an examination of the previous list of 32 compounds, it is to be noted that in certain examples, for instance, Examples 9 to 15, inclusive, all the propylene oxide is added first and then the ethylene oxide is added. Compounds indicated by Examples 1 to 8 are substantially the same, as far as composition goes, but are reversed, insofar that the ethylene oxide is added first and then the propylene oxide. Other compounds having substantially the same ultimate composition, or at least very closely related ultimate compositions, having a further variation in the distribution of the propylene oxide and ethylene oxide, are exemplified by Formulae 16 to 32, inclusive.

As has been pointed out previously, for some reason which we do not understand and for which we have not been able to offer any satisfactory theory, we have found that the best compounds, or more properly, cogeneric mixtures are obtained when all the propylene oxide is added first and then all the ethylene oxide is added. Although this is true to at least some extent in regard to all compositions within the trapezoidal area in the triangular graph, yet it is particularly true if the composition comes within the segment of the circle previously referred to in the accompanying drawing. In such event, one obtains a much more effective demulsifier than by any other combination employing ethylene oxide alone, propylene oxide alone, or any variation in the mixture of the two, as illustrated by other formulae. In fact, the compound or cogeneric mixture so obtained, as far as demulsification goes, is not infrequently at least one-third better than any other derivative obtained in the manner described involving any of the other above variations.

The significance of what has been said previously becomes more emphatic when one realizes time, in essence, we have found that one "isomer" is a more effective demulsifying agent than another "isomer." The word "isomer" is not exactly right, although it is descriptive for the purpose intended, insofar that we are not concerned with a single compound, but with a cogeneric mixture, which, in its statistical average, corresponds to such compound. Stated another way, if we start with one pound mole of beta-terpineol, 15 pound moles of propylene oxide and 18 pound moles of ethylene oxide, we can prepare two different cogeneric mixtures, which, on a statistical average, correspond to the following:

$$RO(C_2H_4O)_{18}(C_3H_6O)_{15}H$$
and
$$RO(C_3H_6O)_{15}(C_2H_4O)_{18}H$$

There is nothing we know which would suggest that the latter be a much more effective demulsifying agent than the former and also that it be more effective for other industrial purposes. The applicants have had wide experience with a wide variety of surface-active agents, but they are unaware of any other similar situation, with the exception of a few instances which are the subject-matter of other co-pending applications, or under investigation. This feature represents the invention within an invention previously referred to, and thus, becomes the specific subject-matter claimed in our co-pending applications Serial Nos. 109,796, and 109,797, both filed August 11, 1949.

Reference has been made to the fact that the product herein specified, and particularly for use as a demulsifier, represents a cogeneric mixture of closely related homologues. This does not mean that one could not use combinations of such cogeneric mixtures. For instance, in the previous table data have been given for preparation of cogeneric mixtures which statistically correspond, respectively, to points 1, 3 and 6. Such three cogeneric mixtures could be combined in equal weights so as to give a combination in which the mixed statistical average would correspond closely to point 7.

Similarly, one could do the same thing by preparing cogeneric mixtures corresponding to points 2, 4 and 5 described in the previous table. Such mixture could then be combined in equal parts by weight to give another combination which would closely correspond on a mixed statistical basis to point 7. Nothing said herein is intended to preclude such combinations of this or similar type.

PART 3

As has been pointed out previously, one way of preparing compounds or congeneric mixtures to be used in the present invention is to prepare a series of compounds identified as Examples A through S, in Part 2, preceding, or Examples 1a through 6a, as described in Part 2, preceding.

Referring now to Figure 4, it is obvious that the three components (ignoring glycide) are represented by either the lower trapezodial base in Figure 4, i. e., E, F, G, H, or I, J, K, L and then recalculated to 100% basis as a tertiary mixture; such three components must lie within the trapezoid 8, 9, 10, 11 in Figure 3, and the preferred proportions are within the arc of the circle previously described in Part 2 and shown in Figure 3, or more specifically within the large triangle 1, 3, 6 or the smaller triangle 2, 4, 5, or even more specifically at approximately point 7. Stated another way, if one selects the proportion of the three components or reactants (ignoring glycide) and at any stage employs sufficient glycide so that on the basis of the quaternary mixture such glycide represents 2% to 25% of the total by weight, then and in that event one has automatically obtained a composition that is within the limits of the truncated trapezodial pyramid identified by E, F, G, H,—I, J, K, L in Figure 4. This represents the cogeneric mixture or reaction product in terms of initial reactants with the proviso that the glycide content is 2% to 25% by weight and that the remaining three components recalculated to 100% basis (leaving out glycide for the moment)

comes within the trapezoidal area indicated by 8, 9, 10, 11 on the triangular graph, to wit, Figure 3.

We have prepared derivatives of the kind herein described in a scale varying from a few hundred grams or less, in the laboratory to hundreds of pounds on a plant scale. In preparing a large number of examples we have found it particularly advantageous to use laboratory equipment which permits continuous oxypropylation and oxyethylation. More specific reference will be made to treatment with glycide, subsequently in the text. The oxyethylation step is, of course, the same as the oxypropylation step insofar that two low boiling liquids are handled in each instance. What immediately follows refers to oxypropylation and it is understood that oxyethylation can be handled conveniently in exactly the same way.

The oxypropylation procedure employed in the preparation of derivatives from polyhydric reactants has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range; for instance, in most cases we have selected a point of approximately 160° C. to 165° C., as being particularly desirable and stayed within the range of 155° to 180° C. almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as I am aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separable glass resin pot as described in the co-pending application of Melvin De Groote and Bernhard Keiser, Serial No. 82,704, filed March 21, 1949 (now Patent No. 2,499,370, dated March 7, 1950), and offered for sale by numerous laboratory supply houses. If such arrangement is used to prepare laboratory scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirlinging action in the center of the pot. Still better, is the use of a laboratory autoclave of the kind previously described in this part; but in any event, when the initial amount of glycide is added to a suitable reactant, such as sorbital, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

Example 1b

It is to be noted that the procedure followed can be conducted on any convenient scale, that is, on either a small laboratory scale, semi-plant plant scale, pilot plant scale, or large plant scale. We have conducted experiments employing equipment of all such various sizes. Our preference even on a laboratory scale is to use continuous introduction of ethylene and propylene oxide, although this is not necessary. The introduction may be batchwise. Previous reference has been made to the catalyst used in connection with ethylene oxide and propylene oxide. These same alkaline catalysts, particularly caustic soda, caustic potash, sodium methylate, etc., are equally satisfactory with glycide which in many ways seems to be at least as reactive as ethylene oxide and possibly more reactive than propylene oxide.

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M.

The particular piece of equipment employed was adapted for the use of glycide without pressure, as well as the use of ethylene oxide and propylene oxide with pressure. Stated another way, instead of serving as an autoclave only it was also equipped with a water-cooled condenser which could be shut off when used as an autoclave. It was equipped also with an equivalent of a separatory funnel and an equalizing pressure tube so that a liquid such as glycide could be fed continuously at a dropwise or faster rate into the vessel and the rate controlled by visual examination. For convenience, this piece of equipment will be referred to as an autoclave.

There were charged into the autoclave 15.4 pounds of beta-terpineol. There were then added 12.5 ounces (approximately 5% by weight) of ground caustic soda. After being charged the autoclave was sealed, swept with nitrogen gas, and stirring started immediately and heat applied, and the temperature allowed to rise to approximately 120° C.

The glycide employed was comparatively pure. 7.5 pounds of glycide were used. This was charged into the upper reservoir vessel which had been previously flushed out with nitrogen and was the equivalent of a separatory funnel. The glycide was started slowly into the reaction mass in a dropwise stream. The reaction started to take place immediately and the temperature rose approximately 10° to 15°. Cooling water was run through the coils so that the temperature for addition of glycide was controlled within the range roughly of 110° to 130° C. The addition was continuous within the limitations and all the glycide was added in less than three hours. This reaction took place at atmospheric pressure with simply a small stream of nitrogen passing into the autoclave at the very top and passing out through the open condenser so as to avoid any possible entrance of air. When the reaction was complete this condenser was shut off and also the opening to the glycide inlet and to the equalizing line. The equipment was used as an autoclave during the addition of propylene oxide and ethylene oxide. In other words, the equipment was operated under pressure. At this point addition of propylene oxide was started. It was added continuously at such speed that it was absorbed by the reaction as rapidly as added. The amount of propylene oxide added was 88 pounds. The time required to add this propylene oxide was in excess of one hour, about 1¾ hours. During this time the temperature was maintained at 150° to 160° C., using cooling water through the inner coils when necessary and otherwise applying heat if required. At the end of the addition of the propylene oxide there was added ethylene oxide, as previously indicated. The amount of ethylene oxide added was 80 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was considerably more than an hour but less than two hours.

During the addition of the propylene and ethylene oxides, the pressure was held at approximately 50 pounds per square inch gauge pressure, or less. When all the oxide had been added (ethylene oxide being the final addition in this particular instance) the autoclave was permitted to stay at the same temperature range for another half hour, even longer if required, or until the gauge pressure had been reduced to zero or substantially zero, indicating the reaction was complete. The final product was an oily material, somewhat viscous in nature, resembling castor oil and having a definite beta-terpineol or terpene-like odor. It was soluble in water and also soluble in non-aqueous solvents, such as aromatic hydrocarbons, and others, although not soluble in some non-polar hydrocarbon solvents. The final yield was substantially the total weight of the initial reactants.

Example 2b

The same procedure was followed as in Example 1b, preceding, except that the order of addition of the oxides was reversed, the ethylene oxide being added first and the propylene oxide last. The time period, temperature range, pressure, etc., were kept the same as in Example 1b, preceding.

Example 3b

The same ratios, were used, and the same procedure was followed as in Example 1b, but with the following difference; the equipment was used first as an autoclave to add the propylene oxide. All the propylene oxide was added, the condenser was open to atmospheric pressure, a slow stream of nitrogen was passed through the equipment to prevent air from coming in contact with the reaction mass, and then the same amount of glycide was added as in Example 1b, as the second alkylene oxide reactant instead of the first. When all the glycide had been added in approximately a 2-hour period of time, the connections were changed so that the ethylene oxide was added. The amounts employed, operating conditions, etc., were the same as in Example 1b.

Example 4b

The same procedure was followed as in Example 3b, preceding, except that the stages of addition of ethylene oxide and propylene oxide were reversed, that is, the ethylene oxide was added as the first stage, using the equipment as an autoclave, then the glycide was added, and then the propylene oxide. The amounts used, operating conditions, etc., were identically the same as in Example 1b, preceding, except for the order of addition.

Example 5b

The co-generic mixture obtained from Example 1a in Part 2, preceding, was treated with 7.5 pounds of glycide in the manner described in Example 1b, preceding. It is to be noted that in essence this is simply another variation of Example 1b, in which the equipment is used as an autoclave, first to add the propylene oxide and then to add the ethylene oxide, and then the glycide when using the equipment with a condenser open to the atmosphere with a slow stream of nitrogen passing through to prevent entrance of air.

Example 6b

The product obtained from Example 2a in Part 2, preceding, was treated with 7.5 pounds of glycide in the manner described in Example 1b, preceding. It is to be noted that this example again is simply a variation of Example 1b, in which the ethylene oxide was added first and then the propylene oxide. During these two additions the equipment was used as an autoclave and then the customary change made and glycide added to the extent of 7.5 pounds in the manner described in Example 1b, preceding.

Example 7b

The same procedure was followed as in Example 1b with the following change. After the glycide was added the propylene oxide and ethylene oxide were added as a mixture (168 pounds). This mixture of ethylene oxide and propylene oxide was obtained from 88 pounds of propylene oxide and 80 pounds of ethylene oxide. In this instance, again, the time range, temperature, and pressures were kept substantially the same as in Example 1b, preceding.

Example 8b

The product obtained from Example 3a described in Part 2, preceding, was treated with 7.5 pounds of glycide in the manner previously described under the heading of Example 1b. This is in essence simply a variation of Example 7b in which the mixed ethylene oxide and propylene oxide are added, using the equipment first as an autoclave, and then the glycide is added subsequently in the customary manner as previously described.

Example 9b

The examples previously described as Examples 1b, through 8b, inclusive, were repeated making the following change. The amount of catalyst added, instead of being 12.5 ounces was increased to 14 ounces. The amount of glycide used, instead of being 7.5 pounds was increased to 15 pounds. The conditions under which the glycide was added were the same as in previous examples but required approximately 3½ hours instead of 2 hours for the addition of glycide. The amounts of ethylene oxide and propylene oxide and terpineol were kept constant.

Example 10b

The same procedure as in Example 1b, preceding, was conducted on a laboratory scale employing a small autoclave having a capacity of approximately one liter, or up to a 5-gallon size. The amount of beta-terpineol employed was 46.2 grams, the amount of glycide employed was 22.5 grams, the amount of propylene oxide employed was 260 grams, and the amount of ethylene oxide employed was 240 grams. The amount of caustic soda used as a catalyst was 2.4 grams.

The operating conditions were substantially the same as on a larger scale. Actually the reaction seemed to go faster in the small autoclave and the time of absorption could be reduced, if desired. In many instances absorption would take place in the laboratory autoclave in a fraction of the time required in the larger autoclave; in fact, in many instances, absorption was complete in 5 to 10 or 15 minutes, as compared to one hour on a larger scale. Needless to say, on a large scale, addition must be conducted carefully because there is an obvious hazard in handling a large quality of material in an autoclave which is not necessarily present in the use of a small vessel.

Example 11b

The examples conducted on a large scale in Examples 2b to 9b, inclusive, were repeated on a small scale, using the same amount of the ingredients above indicated, except in the subsequent experiments where twice as much glycide was employed, and in such instances the amount of glycide was 45 grams instead of 22 grams, and the amount of catalyst used with this larger amount of glycide was 2.75 grams. In all other respects all the variants were conducted in the same manner as previously described except that oxyethylation and oxypropylation took place much more rapidly, frequently in a manner of minutes as indicated, and the addition of glycide took place in less time, requiring 15 minutes to approximately 50 minutes.

| Reactants Other than Glycide as reported in table in Part Two for Ex. No. | Glycide equal to mol to mol of terpineol | | | Glycide equal to 2 moles per mol of terpineol | | |
|---|---|---|---|---|---|---|
| | Glycide (1) PrO (2) EtO (3) | PrO (1) Glycide (2) EtO (3) | PrO (1) EtO (2) Glycide (3) | Glycide (1) PrO (2) EtO (3) | PrO (1) Glycide (2) EtO (3) | PrO (1) EtO (2) Glycide (3) |
| A | AA | | | 2AA | | |
| B | | BBB | | | 2BBB | |
| C | | | CCCC | | | 2CCCC |
| D | DD | | | 2DD | | |
| E | | EEE | | | 2EEE | |
| F | | | FFFF | | | 2FFFF |
| G | GG | | | 2GG | | |
| H | | HHH | | | 2HHH | |
| I | | | IIII | | | 2IIII |
| J | JJ | | | 2JJ | | |
| K | | KKK | | | 2KKK | |
| L | | | LLLL | | | 2LLLL |
| M | MM | | | 2MM | | |
| N | | NNN | | | 2NNN | |
| O | | | OOOO | | | 2OOOO |
| P | PP | | | 2PP | | |
| Q | | QQQ | | | 2QQQ | |
| R | | | RRRR | | | 2RRRR |
| S | SS | | | 2SS | | |

See the table which appears in Part 2, preceding. This same series of experiments were repeated, using the same equipment and procedure as described in Examples 10b and 11b. The amount of ethylene oxide was equal to the terpineol in a molal ratio or else two moles were employed for each mole of terpineol. In the preparation of these compounds the alkaline catalyst was either flake caustic soda finely ground with mortar and pestle, or powdered sodium methylate equivalent to 6.7% of the terpineol employed. In these experiments the glycide was added at three different points and reacted immediately with terpineol; or the terpineol was reacted with propylene oxide and then with glycide, and then with ethylene oxide; or the terpineol was reacted with propylene oxide, ethylene oxide and glycide. Needless to say, hundreds of variants within the specification of the invention are possible. Not all could be prepared. A number of those prepared are indicated in the table which appears in Part 2. All the experiments in which the proportion of the reactants corresponded to Example A in Part 2 bear the same A indication, for instance, AA. Those which correspond to B, bear the same B indication, for instance, BB. The table immediately preceding shows the order in which the reactants were added to the terpineol. On the left-hand side are those prepared using one mole of glycide for each mole of terpineol. On the right-hand side are included experiments where two moles of glycide were used, and the figure 2 precedes the letters AA, BBB, CCCC, etc. As indicated in this table, spot checks were made across the board insofar that it would have been impossible to prepare all the possible modifications.

Incidentally, the physical appearance of the materials obtained using glycide in addition to ethylene oxide and propylene oxide is substantially the same as those obtained in which glycide is not used. There is no marked difference in physical appearance and glycide does, of course, add a greater proportion of water solubility. Needless to say, visual examination, or simple physical tests do not reveal the differences in structure pointed out in Part 1. These polyglycol ethers are comparatively thin liquids, sometimes showing only modest viscosity, and the color varies from almost water-white to pale amber. The color seems to be due to impurities and is a trace of iron getting into the compound during the process of manufacture, or may be present in the catalyst. The products, of course, show a considerable range of insolubility, from a stage where they are dispersible or miscible, to products which, at least in dilute solution, have an apparently homogeneous or transparent appearance. The odor, if any, is generally suggestive of a terpene or similar product.

PART 4

Referring to Figure 3, it is apparent that although a number of examples have been included, and particular reference is made to Examples A through S, that there is a limit to the numbers which can be included without producing description which becomes burdensome in length. This applies to an even greater degree to the four-component system for the reason that one has included all points within the truncated tetrahedral pyramid depicted in Figure 4 and defined by E, F, G, H—I, J, K, L. However, for convenience, referring to the table which includes A through S in Part 2, it is to be noted that the initial mixture employs 15 parts of terpineol, 45 parts of propylene oxide, and 40 parts of ethylene oxide. In the second example there are employed 10 parts of terpineol, 40 parts ethylene oxide, and 50 parts propylene oxide. The table shows the mixture with the three-component constituent (when recalculated back to 100% basis) and the corresponding figure when 1% to 25% glycide is present. The tables are self-explanatory and illustrate compositions which set the boundary or limiting compositions. We have spot checked such compositions and prepared a substantial number but are not including them for the reason that such inclusion would be only repetitious over and above what has been said previously.

*Table A*

TABLE FOR EX. A SERIES—POINT 1 ON TRIANGULAR GRAPH—(Figure 3)

| Per Cent Glycid | Per Cent Remaining 3 Reactant | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1 | 99 | 15 | 40 | 45 | 14.8 | 39.6 | 44.6 |
| 2 | 98 | 15 | 40 | 45 | 14.7 | 39.2 | 44.1 |
| 3 | 97 | 15 | 40 | 45 | 14.5 | 38.8 | 43.7 |
| 4 | 96 | 15 | 40 | 45 | 14.4 | 38.4 | 43.2 |
| 5 | 95 | 15 | 40 | 45 | 14.2 | 38.0 | 42.8 |
| 6 | 94 | 15 | 40 | 45 | 14.1 | 37.6 | 42.3 |
| 7 | 93 | 15 | 40 | 45 | 13.9 | 37.2 | 41.9 |
| 8 | 92 | 15 | 40 | 45 | 13.8 | 36.8 | 41.4 |
| 9 | 91 | 15 | 40 | 45 | 13.6 | 36.4 | 41.0 |
| 10 | 90 | 15 | 40 | 45 | 13.5 | 36.0 | 40.5 |
| 11 | 89 | 15 | 40 | 45 | 13.3 | 35.6 | 40.1 |
| 12 | 88 | 15 | 40 | 45 | 13.2 | 35.2 | 39.6 |
| 13 | 87 | 15 | 40 | 45 | 13.0 | 34.8 | 39.2 |
| 14 | 86 | 15 | 40 | 45 | 12.9 | 34.4 | 38.7 |
| 15 | 85 | 15 | 40 | 45 | 12.7 | 34.0 | 38.3 |
| 16 | 84 | 15 | 40 | 45 | 12.6 | 33.6 | 37.8 |
| 17 | 83 | 15 | 40 | 45 | 12.4 | 33.2 | 37.4 |
| 18 | 82 | 15 | 40 | 45 | 12.3 | 32.8 | 36.9 |
| 19 | 81 | 15 | 40 | 45 | 12.1 | 32.4 | 36.5 |
| 20 | 80 | 15 | 40 | 45 | 12.0 | 32.0 | 36.0 |
| 21 | 79 | 15 | 40 | 45 | 11.8 | 31.6 | 35.6 |
| 22 | 78 | 15 | 40 | 45 | 11.7 | 31.2 | 35.1 |
| 23 | 77 | 15 | 40 | 45 | 11.5 | 30.8 | 34.7 |
| 24 | 76 | 15 | 40 | 45 | 11.4 | 30.4 | 34.2 |
| 25 | 75 | 15 | 40 | 45 | 11.2 | 30.4 | 33.8 |

Table B

TABLE FOR EX. B SERIES—POINT 2 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1  | 99 | 10 | 40 | 50 | 9.9 | 39.6 | 49.5 |
| 2  | 98 | 10 | 40 | 50 | 9.8 | 39.2 | 49.0 |
| 3  | 97 | 10 | 40 | 50 | 9.7 | 38.8 | 48.5 |
| 4  | 96 | 10 | 40 | 50 | 9.6 | 38.4 | 48.0 |
| 5  | 95 | 10 | 40 | 50 | 9.5 | 38.0 | 47.5 |
| 6  | 94 | 10 | 40 | 50 | 9.4 | 37.6 | 47.0 |
| 7  | 93 | 10 | 40 | 50 | 9.3 | 37.2 | 46.5 |
| 8  | 92 | 10 | 40 | 50 | 9.2 | 36.8 | 46.0 |
| 9  | 91 | 10 | 40 | 50 | 9.1 | 36.4 | 45.5 |
| 10 | 90 | 10 | 40 | 50 | 9.0 | 36.0 | 45.0 |
| 11 | 89 | 10 | 40 | 50 | 8.9 | 35.6 | 44.5 |
| 12 | 88 | 10 | 40 | 50 | 8.8 | 35.2 | 44.0 |
| 13 | 87 | 10 | 40 | 50 | 8.7 | 34.8 | 43.5 |
| 14 | 86 | 10 | 40 | 50 | 8.6 | 34.4 | 43.0 |
| 15 | 85 | 10 | 40 | 50 | 8.5 | 34.0 | 42.5 |
| 16 | 84 | 10 | 40 | 50 | 8.4 | 33.6 | 42.0 |
| 17 | 83 | 10 | 40 | 50 | 8.3 | 33.2 | 41.5 |
| 18 | 82 | 10 | 40 | 50 | 8.2 | 32.8 | 41.0 |
| 19 | 81 | 10 | 40 | 50 | 8.1 | 32.4 | 40.5 |
| 20 | 80 | 10 | 40 | 50 | 8.0 | 32.0 | 40.0 |
| 21 | 79 | 10 | 40 | 50 | 7.9 | 31.6 | 39.5 |
| 22 | 78 | 10 | 40 | 50 | 7.8 | 31.2 | 39.0 |
| 23 | 77 | 10 | 40 | 50 | 7.7 | 30.8 | 38.5 |
| 24 | 76 | 10 | 40 | 50 | 7.6 | 30.4 | 38.0 |
| 25 | 75 | 10 | 40 | 50 | 7.5 | 30.0 | 37.5 |

Table C

TABLE FOR EX. C SERIES—POINT 3 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1  | 99 | 5 | 40 | 55 | 4.9 | 39.6 | 54.5 |
| 2  | 98 | 5 | 40 | 55 | 4.9 | 39.2 | 53.9 |
| 3  | 97 | 5 | 40 | 55 | 4.8 | 38.8 | 53.4 |
| 4  | 96 | 5 | 40 | 55 | 4.8 | 38.4 | 52.8 |
| 5  | 95 | 5 | 40 | 55 | 4.7 | 38.0 | 52.3 |
| 6  | 94 | 5 | 40 | 55 | 4.7 | 37.6 | 51.7 |
| 7  | 93 | 5 | 40 | 55 | 4.6 | 37.2 | 51.2 |
| 8  | 92 | 5 | 40 | 55 | 4.6 | 36.8 | 50.6 |
| 9  | 91 | 5 | 40 | 55 | 4.5 | 36.4 | 50.1 |
| 10 | 90 | 5 | 40 | 55 | 4.5 | 36.0 | 49.5 |
| 11 | 89 | 5 | 40 | 55 | 4.4 | 35.6 | 49.0 |
| 12 | 88 | 5 | 40 | 55 | 4.4 | 35.2 | 48.4 |
| 13 | 87 | 5 | 40 | 55 | 4.3 | 34.8 | 47.9 |
| 14 | 86 | 5 | 40 | 55 | 4.3 | 34.4 | 47.3 |
| 15 | 85 | 5 | 40 | 55 | 4.2 | 34.0 | 46.8 |
| 16 | 84 | 5 | 40 | 55 | 4.2 | 33.6 | 46.4 |
| 17 | 83 | 5 | 40 | 55 | 4.1 | 33.2 | 45.7 |
| 18 | 82 | 5 | 40 | 55 | 4.1 | 32.8 | 45.1 |
| 19 | 81 | 5 | 40 | 55 | 4.0 | 32.4 | 44.6 |
| 20 | 80 | 5 | 40 | 55 | 4.0 | 32.0 | 44.0 |
| 21 | 79 | 5 | 40 | 55 | 3.9 | 31.6 | 43.5 |
| 22 | 78 | 5 | 40 | 55 | 3.9 | 31.2 | 42.9 |
| 23 | 77 | 5 | 40 | 55 | 3.8 | 30.8 | 42.4 |
| 24 | 76 | 5 | 40 | 55 | 3.8 | 30.4 | 41.8 |
| 25 | 75 | 5 | 40 | 55 | 3.7 | 30.0 | 41.3 |

Table D

TABLE FOR EX. D SERIES—POINT 4 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1 | 99 | 10 | 45 | 45 | 9.9 | 44.6 | 44.5 |
| 2 | 98 | 10 | 45 | 45 | 9.8 | 44.1 | 44.1 |
| 3 | 97 | 10 | 45 | 45 | 9.7 | 43.7 | 43.6 |
| 4 | 96 | 10 | 45 | 45 | 9.6 | 43.2 | 43.2 |
| 5 | 95 | 10 | 45 | 45 | 9.5 | 42.8 | 43.7 |
| 6 | 94 | 10 | 45 | 45 | 9.4 | 42.3 | 42.3 |
| 7 | 93 | 10 | 45 | 45 | 9.3 | 41.9 | 41.8 |
| 8 | 92 | 10 | 45 | 45 | 9.2 | 41.4 | 41.4 |
| 9 | 91 | 10 | 45 | 45 | 9.1 | 41.0 | 40.9 |
| 10 | 90 | 10 | 45 | 45 | 9.0 | 40.5 | 40.5 |
| 11 | 89 | 10 | 45 | 45 | 8.9 | 40.1 | 40.0 |
| 12 | 88 | 10 | 45 | 45 | 8.8 | 39.6 | 39.6 |
| 13 | 87 | 10 | 45 | 45 | 8.7 | 39.2 | 39.1 |
| 14 | 86 | 10 | 45 | 45 | 8.6 | 38.7 | 38.7 |
| 15 | 85 | 10 | 45 | 45 | 8.5 | 38.3 | 38.2 |
| 16 | 84 | 10 | 45 | 45 | 8.4 | 37.8 | 37.8 |
| 17 | 83 | 10 | 45 | 45 | 8.3 | 37.4 | 37.3 |
| 18 | 82 | 10 | 45 | 45 | 8.2 | 36.9 | 36.9 |
| 19 | 81 | 10 | 45 | 45 | 8.1 | 36.5 | 36.4 |
| 20 | 80 | 10 | 45 | 45 | 8.0 | 36.0 | 36.0 |
| 21 | 79 | 10 | 45 | 45 | 7.9 | 35.6 | 35.5 |
| 22 | 78 | 10 | 45 | 45 | 7.8 | 35.1 | 35.1 |
| 23 | 77 | 10 | 45 | 45 | 7.7 | 34.7 | 34.6 |
| 24 | 76 | 10 | 45 | 45 | 7.6 | 34.2 | 34.2 |
| 25 | 75 | 10 | 45 | 45 | 7.5 | 33.8 | 33.7 |

Table E

TABLE FOR EX. E SERIES—POINT 5 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1 | 99 | 5 | 45 | 50 | 4.9 | 44.6 | 49.5 |
| 2 | 98 | 5 | 45 | 50 | 4.9 | 44.1 | 49.0 |
| 3 | 97 | 5 | 45 | 50 | 4.8 | 43.7 | 48.5 |
| 4 | 96 | 5 | 45 | 50 | 4.8 | 43.2 | 48.0 |
| 5 | 95 | 5 | 45 | 50 | 4.7 | 42.8 | 47.5 |
| 6 | 94 | 5 | 45 | 50 | 4.7 | 42.3 | 47.0 |
| 7 | 93 | 5 | 45 | 50 | 4.6 | 41.9 | 46.5 |
| 8 | 92 | 5 | 45 | 50 | 4.6 | 41.4 | 46.0 |
| 9 | 91 | 5 | 45 | 50 | 4.5 | 41.0 | 45.5 |
| 10 | 90 | 5 | 45 | 50 | 4.5 | 40.5 | 45.0 |
| 11 | 89 | 5 | 45 | 50 | 4.4 | 40.1 | 44.5 |
| 12 | 88 | 5 | 45 | 50 | 4.4 | 39.6 | 44.0 |
| 13 | 87 | 5 | 45 | 50 | 4.3 | 39.2 | 43.5 |
| 14 | 86 | 5 | 45 | 50 | 4.3 | 38.7 | 43.0 |
| 15 | 85 | 5 | 45 | 50 | 4.2 | 38.3 | 42.5 |
| 16 | 84 | 5 | 45 | 50 | 4.2 | 37.8 | 42.0 |
| 17 | 83 | 5 | 45 | 50 | 4.1 | 37.4 | 41.5 |
| 18 | 82 | 5 | 45 | 50 | 4.1 | 36.9 | 41.0 |
| 19 | 81 | 5 | 45 | 50 | 4.0 | 36.5 | 40.5 |
| 20 | 80 | 5 | 45 | 50 | 4.0 | 36.0 | 40.0 |
| 21 | 79 | 5 | 45 | 50 | 3.9 | 35.6 | 39.5 |
| 22 | 78 | 5 | 45 | 50 | 3.9 | 35.1 | 39.0 |
| 23 | 77 | 5 | 45 | 50 | 3.8 | 34.7 | 38.5 |
| 24 | 76 | 5 | 45 | 50 | 3.8 | 34.2 | 38.0 |
| 25 | 75 | 5 | 45 | 50 | 3.7 | 33.8 | 37.5 |

Table F

TABLE FOR EX. F SERIES—POINT 6 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1 | 99 | 5 | 50 | 45 | 4.9 | 49.5 | 44.6 |
| 2 | 98 | 5 | 50 | 45 | 4.9 | 49.0 | 44.1 |
| 3 | 97 | 5 | 50 | 45 | 4.8 | 48.5 | 43.7 |
| 4 | 96 | 5 | 50 | 45 | 4.8 | 48.0 | 43.2 |
| 5 | 95 | 5 | 50 | 45 | 4.7 | 47.5 | 42.8 |
| 6 | 94 | 5 | 50 | 45 | 4.7 | 47.0 | 42.3 |
| 7 | 93 | 5 | 50 | 45 | 4.6 | 46.5 | 41.9 |
| 8 | 92 | 5 | 50 | 45 | 4.6 | 46.0 | 41.4 |
| 9 | 91 | 5 | 50 | 45 | 4.5 | 45.5 | 41.0 |
| 10 | 90 | 5 | 50 | 45 | 4.5 | 45.0 | 40.5 |
| 11 | 89 | 5 | 50 | 45 | 4.4 | 44.5 | 40.1 |
| 12 | 88 | 5 | 50 | 45 | 4.4 | 44.0 | 39.6 |
| 13 | 87 | 5 | 50 | 45 | 4.3 | 43.5 | 39.2 |
| 14 | 86 | 5 | 50 | 45 | 4.3 | 43.0 | 38.7 |
| 15 | 85 | 5 | 50 | 45 | 4.2 | 42.5 | 38.3 |
| 16 | 84 | 5 | 50 | 45 | 4.2 | 42.0 | 37.8 |
| 17 | 83 | 5 | 50 | 45 | 4.1 | 41.5 | 37.4 |
| 18 | 82 | 5 | 50 | 45 | 4.1 | 41.0 | 36.9 |
| 19 | 81 | 5 | 50 | 45 | 4.0 | 40.5 | 36.5 |
| 20 | 80 | 5 | 50 | 45 | 4.0 | 40.0 | 36.0 |
| 21 | 79 | 5 | 50 | 45 | 3.9 | 39.5 | 35.6 |
| 22 | 78 | 5 | 50 | 45 | 3.9 | 39.0 | 35.1 |
| 23 | 77 | 5 | 50 | 45 | 3.8 | 38.5 | 34.7 |
| 24 | 76 | 5 | 50 | 45 | 3.8 | 38.0 | 34.2 |
| 25 | 75 | 5 | 50 | 45 | 3.7 | 37.5 | 33.8 |

Table G

TABLE FOR EX. G SERIES—POINT 7 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PeO |
| 1 | 99 | 8.45 | 44.0 | 47.55 | 8.36 | 43.6 | 47.04 |
| 2 | 98 | 8.45 | 44.0 | 47.55 | 8.28 | 43.2 | 46.52 |
| 3 | 97 | 8.45 | 44.0 | 47.55 | 8.20 | 42.7 | 46.10 |
| 4 | 96 | 8.45 | 44.0 | 47.55 | 8.12 | 42.2 | 45.68 |
| 5 | 95 | 8.45 | 44.0 | 47.55 | 8.04 | 41.8 | 45.16 |
| 6 | 94 | 8.45 | 44.0 | 47.55 | 7.94 | 41.3 | 44.76 |
| 7 | 93 | 8.45 | 44.0 | 47.55 | 7.86 | 40.9 | 44.24 |
| 8 | 92 | 8.45 | 44.0 | 47.55 | 7.78 | 40.5 | 43.72 |
| 9 | 91 | 8.45 | 44.0 | 47.55 | 7.70 | 40.0 | 43.30 |
| 10 | 90 | 8.45 | 44.0 | 47.55 | 7.62 | 39.6 | 42.78 |
| 11 | 89 | 8.45 | 44.0 | 47.55 | 7.53 | 39.2 | 42.27 |
| 12 | 88 | 8.45 | 44.0 | 47.55 | 7.44 | 38.7 | 41.86 |
| 13 | 87 | 8.45 | 44.0 | 47.55 | 7.36 | 38.3 | 41.34 |
| 14 | 86 | 8.45 | 44.0 | 47.55 | 7.27 | 37.8 | 40.93 |
| 15 | 85 | 8.45 | 44.0 | 47.55 | 7.18 | 37.4 | 40.42 |
| 16 | 84 | 8.45 | 44.0 | 47.55 | 7.10 | 37.0 | 39.90 |
| 17 | 83 | 8.45 | 44.0 | 47.55 | 7.02 | 36.5 | 39.48 |
| 18 | 82 | 8.45 | 44.0 | 47.55 | 6.94 | 36.1 | 38.96 |
| 19 | 81 | 8.45 | 44.0 | 47.55 | 6.85 | 35.7 | 38.45 |
| 20 | 80 | 8.45 | 44.0 | 47.55 | 6.76 | 35.2 | 38.04 |
| 21 | 79 | 8.45 | 44.0 | 47.55 | 6.68 | 34.8 | 37.52 |
| 22 | 78 | 8.45 | 44.0 | 47.55 | 6.59 | 34.3 | 37.11 |
| 23 | 77 | 8.45 | 44.0 | 47.55 | 6.51 | 33.8 | 36.69 |
| 24 | 76 | 8.45 | 44.0 | 47.55 | 6.43 | 33.3 | 36.27 |
| 25 | 75 | 8.45 | 44.0 | 47.55 | 6.34 | 33.0 | 35.66 |

Table H

TABLE FOR EX. H SERIES—POINT 8 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PeO |
| 1 | 99 | 20 | 54 | 26 | 19.8 | 53.4 | 25.8 |
| 2 | 98 | 20 | 54 | 26 | 19.6 | 53.1 | 25.5 |
| 3 | 97 | 20 | 54 | 26 | 19.4 | 52.4 | 25.2 |
| 4 | 96 | 20 | 54 | 26 | 19.2 | 51.8 | 25.0 |
| 5 | 95 | 20 | 54 | 26 | 19.0 | 51.3 | 24.7 |
| 6 | 94 | 20 | 54 | 26 | 18.8 | 50.8 | 24.4 |
| 7 | 93 | 20 | 54 | 26 | 18.6 | 50.2 | 24.2 |
| 8 | 92 | 20 | 54 | 26 | 18.4 | 49.7 | 23.9 |
| 9 | 91 | 20 | 54 | 26 | 18.2 | 49.2 | 23.6 |
| 10 | 90 | 20 | 54 | 26 | 18.0 | 48.6 | 23.4 |
| 11 | 89 | 20 | 54 | 26 | 17.8 | 48.1 | 23.1 |
| 12 | 88 | 20 | 54 | 26 | 17.6 | 47.5 | 22.8 |
| 13 | 87 | 20 | 54 | 26 | 17.4 | 47.0 | 22.6 |
| 14 | 86 | 20 | 54 | 26 | 17.2 | 46.5 | 22.3 |
| 15 | 85 | 20 | 54 | 26 | 17.0 | 45.9 | 22.1 |
| 16 | 84 | 20 | 54 | 26 | 16.8 | 45.3 | 21.8 |
| 17 | 83 | 20 | 54 | 26 | 16.6 | 44.8 | 21.6 |
| 18 | 82 | 20 | 54 | 26 | 16.4 | 44.2 | 21.3 |
| 19 | 81 | 20 | 54 | 26 | 16.2 | 43.7 | 21.1 |
| 20 | 80 | 20 | 54 | 26 | 16.0 | 43.2 | 20.8 |
| 21 | 79 | 20 | 54 | 26 | 15.8 | 42.7 | 20.5 |
| 22 | 78 | 20 | 54 | 26 | 15.6 | 42.1 | 20.3 |
| 23 | 77 | 20 | 54 | 26 | 15.4 | 41.6 | 20.0 |
| 24 | 76 | 20 | 54 | 26 | 15.2 | 41.1 | 19.7 |
| 25 | 75 | 20 | 54 | 26 | 15.0 | 40.5 | 19.5 |

Table I

TABLE FOR EX. I SERIES—POINT 9 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PeO |
| 1 | 99 | 4 | 70 | 26 | 3.9 | 69.3 | 25.8 |
| 2 | 98 | 4 | 70 | 26 | 3.9 | 68.6 | 25.5 |
| 3 | 97 | 4 | 70 | 26 | 3.9 | 67.8 | 25.3 |
| 4 | 96 | 4 | 70 | 26 | 3.8 | 67.2 | 25.0 |
| 5 | 95 | 4 | 70 | 26 | 3.8 | 66.5 | 24.7 |
| 6 | 94 | 4 | 70 | 26 | 3.8 | 65.8 | 24.4 |
| 7 | 93 | 4 | 70 | 26 | 3.7 | 65.0 | 24.3 |
| 8 | 92 | 4 | 70 | 26 | 3.7 | 64.2 | 24.1 |
| 9 | 91 | 4 | 70 | 26 | 3.6 | 63.6 | 23.8 |
| 10 | 90 | 4 | 70 | 26 | 3.6 | 63.0 | 23.4 |
| 11 | 89 | 4 | 70 | 26 | 3.6 | 62.2 | 23.1 |
| 12 | 88 | 4 | 70 | 26 | 3.5 | 61.5 | 23.0 |
| 13 | 87 | 4 | 70 | 26 | 3.5 | 60.9 | 22.6 |
| 14 | 86 | 4 | 70 | 26 | 3.4 | 60.2 | 22.4 |
| 15 | 85 | 4 | 70 | 26 | 3.4 | 59.5 | 22.1 |
| 16 | 84 | 4 | 70 | 26 | 3.4 | 58.8 | 21.8 |
| 17 | 83 | 4 | 70 | 26 | 3.3 | 58.1 | 21.6 |
| 18 | 82 | 4 | 70 | 26 | 3.3 | 57.3 | 21.4 |
| 19 | 81 | 4 | 70 | 26 | 3.2 | 56.7 | 21.1 |
| 20 | 80 | 4 | 70 | 26 | 3.2 | 56.0 | 20.8 |
| 21 | 79 | 4 | 70 | 26 | 3.2 | 55.3 | 20.5 |
| 22 | 78 | 4 | 70 | 26 | 3.1 | 54.6 | 20.3 |
| 23 | 77 | 4 | 70 | 26 | 3.0 | 54.0 | 20.0 |
| 24 | 76 | 4 | 70 | 26 | 3.0 | 53.3 | 19.7 |
| 25 | 75 | 4 | 70 | 26 | 3.0 | 52.5 | 19.5 |

Table J

TABLE FOR EX. J. SERIES—POINT 10 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PeO |
| 1 | 99 | 4 | 20 | 76 | 3.9 | 19.8 | 75.3 |
| 2 | 98 | 4 | 20 | 76 | 3.9 | 19.6 | 74.5 |
| 3 | 97 | 4 | 20 | 76 | 3.9 | 19.4 | 73.7 |
| 4 | 96 | 4 | 20 | 76 | 3.8 | 19.2 | 73.0 |
| 5 | 95 | 4 | 20 | 76 | 3.8 | 19.0 | 72.2 |
| 6 | 94 | 4 | 20 | 76 | 3.8 | 18.8 | 71.4 |
| 7 | 93 | 4 | 20 | 76 | 3.7 | 18.6 | 70.7 |
| 8 | 92 | 4 | 20 | 76 | 3.7 | 18.4 | 69.9 |
| 9 | 91 | 4 | 20 | 76 | 3.7 | 18.2 | 69.1 |
| 10 | 90 | 4 | 20 | 76 | 3.6 | 18.0 | 68.4 |
| 11 | 89 | 4 | 20 | 76 | 3.6 | 17.8 | 67.6 |
| 12 | 88 | 4 | 20 | 76 | 3.6 | 17.6 | 66.8 |
| 13 | 87 | 4 | 20 | 76 | 3.5 | 17.4 | 66.1 |
| 14 | 86 | 4 | 20 | 76 | 3.5 | 17.2 | 65.3 |
| 15 | 85 | 4 | 20 | 76 | 3.4 | 17.0 | 64.6 |
| 16 | 84 | 4 | 20 | 76 | 3.4 | 16.8 | 63.8 |
| 17 | 83 | 4 | 20 | 76 | 3.4 | 16.6 | 63.0 |
| 18 | 82 | 4 | 20 | 76 | 3.3 | 16.4 | 62.3 |
| 19 | 81 | 4 | 20 | 76 | 3.3 | 16.2 | 61.5 |
| 20 | 80 | 4 | 20 | 76 | 3.2 | 16.0 | 60.8 |
| 21 | 79 | 4 | 20 | 76 | 3.1 | 15.8 | 60.1 |
| 22 | 78 | 4 | 20 | 76 | 3.2 | 15.6 | 59.2 |
| 23 | 77 | 4 | 20 | 76 | 3.0 | 15.4 | 58.6 |
| 24 | 76 | 4 | 20 | 76 | 3.0 | 15.2 | 56.8 |
| 25 | 75 | 4 | 20 | 76 | 3.0 | 15.0 | 57.0 |

Table K

TABLE FOR EX. K SERIES—POINT 11 ON TRIANGULAR GRAPH—
(Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Beta Terpineol | EtO | PrO | Beta Terpineol | EtO | PrO |
| 1 | 99 | 20 | 20 | 60 | 19.8 | 19.8 | 59.4 |
| 2 | 98 | 20 | 20 | 60 | 19.6 | 19.6 | 58.8 |
| 3 | 97 | 20 | 20 | 60 | 19.4 | 19.4 | 58.2 |
| 4 | 96 | 20 | 20 | 60 | 19.2 | 19.2 | 57.6 |
| 5 | 95 | 20 | 20 | 60 | 19.0 | 19.0 | 57.0 |
| 6 | 94 | 20 | 20 | 60 | 18.8 | 18.8 | 56.4 |
| 7 | 93 | 20 | 20 | 60 | 18.6 | 18.6 | 55.8 |
| 8 | 92 | 20 | 20 | 60 | 18.4 | 18.4 | 55.2 |
| 9 | 91 | 20 | 20 | 60 | 18.2 | 18.2 | 54.6 |
| 10 | 90 | 20 | 20 | 60 | 18.0 | 18.0 | 54.0 |
| 11 | 89 | 20 | 20 | 60 | 17.8 | 17.8 | 53.4 |
| 12 | 88 | 20 | 20 | 60 | 17.6 | 17.6 | 52.8 |
| 13 | 87 | 20 | 20 | 60 | 17.4 | 17.4 | 52.2 |
| 14 | 86 | 20 | 20 | 60 | 17.2 | 17.2 | 51.6 |
| 15 | 85 | 20 | 20 | 60 | 17.0 | 17.0 | 51.0 |
| 16 | 84 | 20 | 20 | 60 | 16.8 | 16.8 | 50.4 |
| 17 | 83 | 20 | 20 | 60 | 16.6 | 16.6 | 49.8 |
| 18 | 82 | 20 | 20 | 60 | 16.4 | 16.4 | 49.2 |
| 19 | 81 | 20 | 20 | 60 | 16.2 | 16.2 | 48.6 |
| 20 | 80 | 20 | 20 | 60 | 16.0 | 16.0 | 48.0 |
| 21 | 79 | 20 | 20 | 60 | 15.8 | 15.8 | 47.4 |
| 22 | 78 | 20 | 20 | 60 | 15.6 | 15.6 | 46.8 |
| 23 | 77 | 20 | 20 | 60 | 15.4 | 15.4 | 46.2 |
| 24 | 76 | 20 | 20 | 60 | 15.2 | 15.2 | 45.6 |
| 25 | 75 | 20 | 20 | 60 | 15.0 | 15.0 | 45.0 |

PART 5

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000 or 1 to 50,000 as in desalting practice, such an apparent insolubility in oil and water is not significant because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or sub-surface- or surface-active. Such resins in turn are oxyalkylation-susceptible, water-insoluble, organic solvent-soluble, fusible phenol-aldehyde resins, derived from difunctional phenols having a 2,4,6 hydrocarbon substituent with 4 to 8 carbon atoms. Based on actual large scale application in a large number of oil fields in the United States and certain foreign countries, we believe that this type of material, either as such or in the form of derivatives, will ultimately be employed in no less than 50% of all chemical demulsifying agents used throughout the world.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into hte flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 1b, 20%;

A cyclohexylamine salt of a polypropylated naphthalene mono-sulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described our invention, what we claim as new and desire to secure by Letters Patent is:

1. A process for breaking petroleum emulsions of the water-in-oil type, characterized by subjecting the emulsion to the action of a demulsifier including at least one cogeneric mixture of a homologous series of glycol ethers of beta-terpineol; said cogeneric mixture being derived exclusively from beta-terpineol, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight that the remaining three initial reactants, recalculated to a 100% basis, lie approximately within the trapezoidal area defined approximately in Figure 3 by points 8, 9, 10 and 11.

2. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the trapezoidal area defined approximately in Figure 3 by points 8, 9, 10 and 11.

3. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the segment of the circle of the drawing in which the minimum alpha-terpineol content is at least 4% and which circle is identified by the fact that points 1, 3 and 6 lie on its circumference, as shown in Figure 3.

4. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the triangular area defined in Figure 3 as points 1, 3 and 6.

5. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately within the triangular area defined in Figure 3 as points 2, 4 and 5.

6. A process for breaking petroleum emulsions of the water-in-oil type, characterized by subjecting the emulsion to the action of a demulsifier including a cogeneric mixture of a homologous series of glycol ethers of beta-terpineol;

said cogeneric mixture being derived exclusively from beta-terpineol, glycide, ethylene oxide and propylene oxide in such weight proportions so the average composition of said cogeneric mixture stated in terms of intial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie approximately at point 7 in Figure 3.

7. A process for breaking petroleum emulsions of the water-in-oil type, characterized by subjecting the emulsion to the action of a demulsifier including a single cogeneric mixture of a holomogous series of glycol ethers of beta-terpineol; said cogeneric mixture being derived exclusively from beta-terpineol, glycide, ethylene oxide and propylene oxide in such weight proportions so the average composition of said cogeneric mixture stated in terms of initial reactants lies approximately within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lies approximately at point 7 in the Figure 3.

MELVIN DE GROOTE.
ARTHUR F. WIRTEL.
OWEN H. PETTINGILL.

REFERENCES CITED

The following references are of record in the file of this patent:

UNITED STATES PATENTS

| Number | Name | Date |
|---|---|---|
| 2,233,383 | De Groote et al. | Feb. 25, 1941 |
| 2,243,330 | DeGroote et al | May 27, 1941 |
| 2,307,058 | Moeller | Jan. 5, 1943 |
| 2,317,726 | Boedeker et al. | Apr. 27, 1943 |
| 2,330,474 | De Groote | Sept. 28, 1943 |
| 2,440,093 | Israel | Apr. 20, 1948 |
| 2,481,278 | Ballard et al. | Sept. 6, 1949 |